INVENTOR
Herman J. Braun

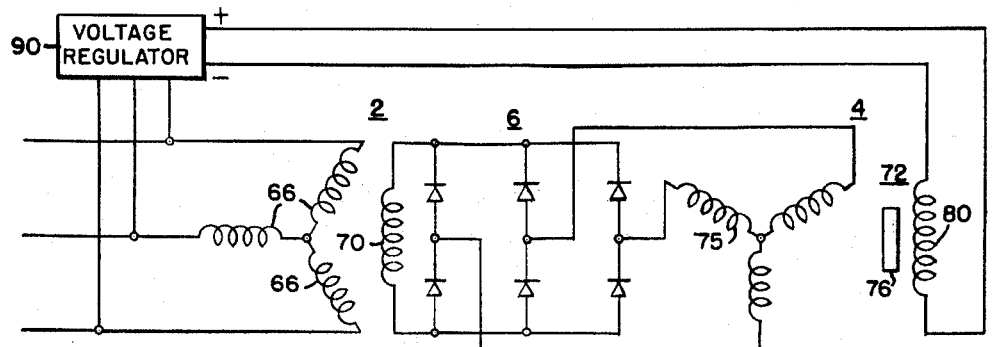
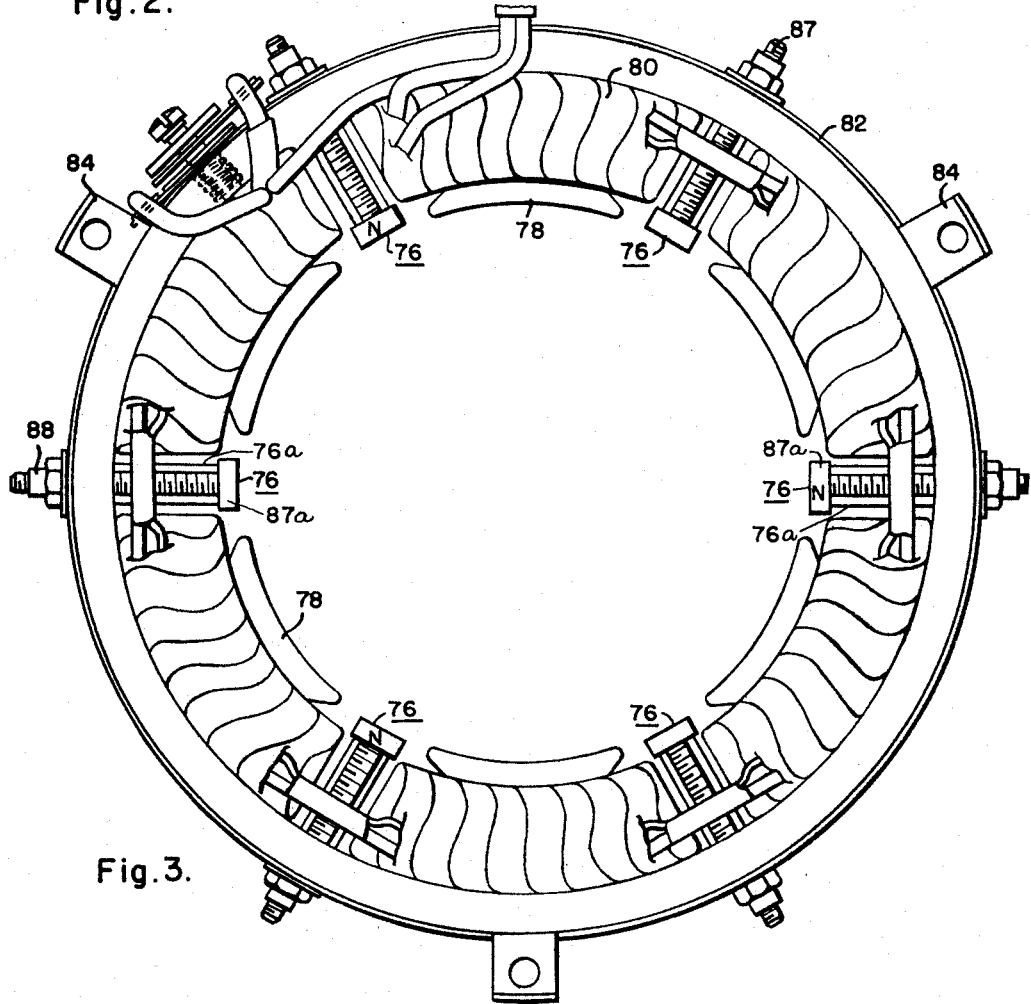

United States Patent Office 3,010,040
Patented Nov. 21, 1961

3,010,040
STARTING EXCITATION SYSTEM FOR DYNAMOELECTRIC MACHINES
Herman J. Braun, Shawnee, Ohio, assignor to Westinghouse Electric Corporation, East Pittsburgh, Pa., a corporation of Pennsylvania
Filed Feb. 24, 1958, Ser. No. 717,199
4 Claims. (Cl. 310—112)

The present invention relates to dynamoelectric machines and, more particularly, to an improved field structure for an exciter on an alternating-current generator. The invention is especially applicable to generators of the brushless type which have a rotating direct-current field winding and in which excitation for the direct-current field is provided by an alternating-current exciter which has a stationary direct-current field member and a rotating alternating-current armature member mounted on the same shaft as the field member of the main machine. It will be obvious that the usefulness of the invention is not necessarily restricted to this specific application and it may be applied to any type of dynamoelectric machine.

Alternating-current generators of the rotating field type which use alternating-current exciters having stationary direct-current fields and rotating rectifiers to rectify the exciter output for the rotating direct-current generator field do not ordinarily have adequate residual magnetism to insure voltage buildup through normal regulators. In the past, such systems have used auxiliary sources of direct-current voltage to flash the field of the exciter and to promote buildup. Such auxiliary sources of direct-current voltage included batteries and shaft-driven auxiliary exciters. In many applications, the use of these auxiliary sources of direct-current voltage are uneconomical and complicated. Batteries and auxiliary exciters require additional relays and controls which add to the cost, size and weight of the generator. In aircraft applications, for example, elimination of the field flashing which results in lighter and smaller equipment is a desirable objective.

The principal object of the present invention, therefore, is to provide in a dynamoelectric machine a simple field structure for an exciter which eliminates the need for auxiliary sources of direct-current voltage, insures buildup, does not affect normal operation of the machine and requires a minimum of additional weight.

A more specific object of the invention is to provide in a dynamoelectric machine a field structure for an exciter which utilizes permanent magnet poles to promote build-up so arranged and constructed as to be ineffective during normal running conditions and which eliminates the need for auxiliary sources of direct-current voltage for field flashing.

A further object of the invention is to provide in a dynamoelectric machine a field structure for an exciter which utilizes permanent magnet poles in the interpolar spaces between the main electromagnetic poles to promote build-up during starting conditions, but which do not affect normal running conditions.

Other objects and advantages of the invention will be apparent from the following detailed description taken in connection with the accompanying drawings, in which:

FIG. 2 is an electrical diagram illustrating the present invention; and

FIG. 3 is a transverse sectional view of the field structure of the exciter taken on line III—III of FIG. 1 illustrating the field structure of the present invention.

Figure 1:
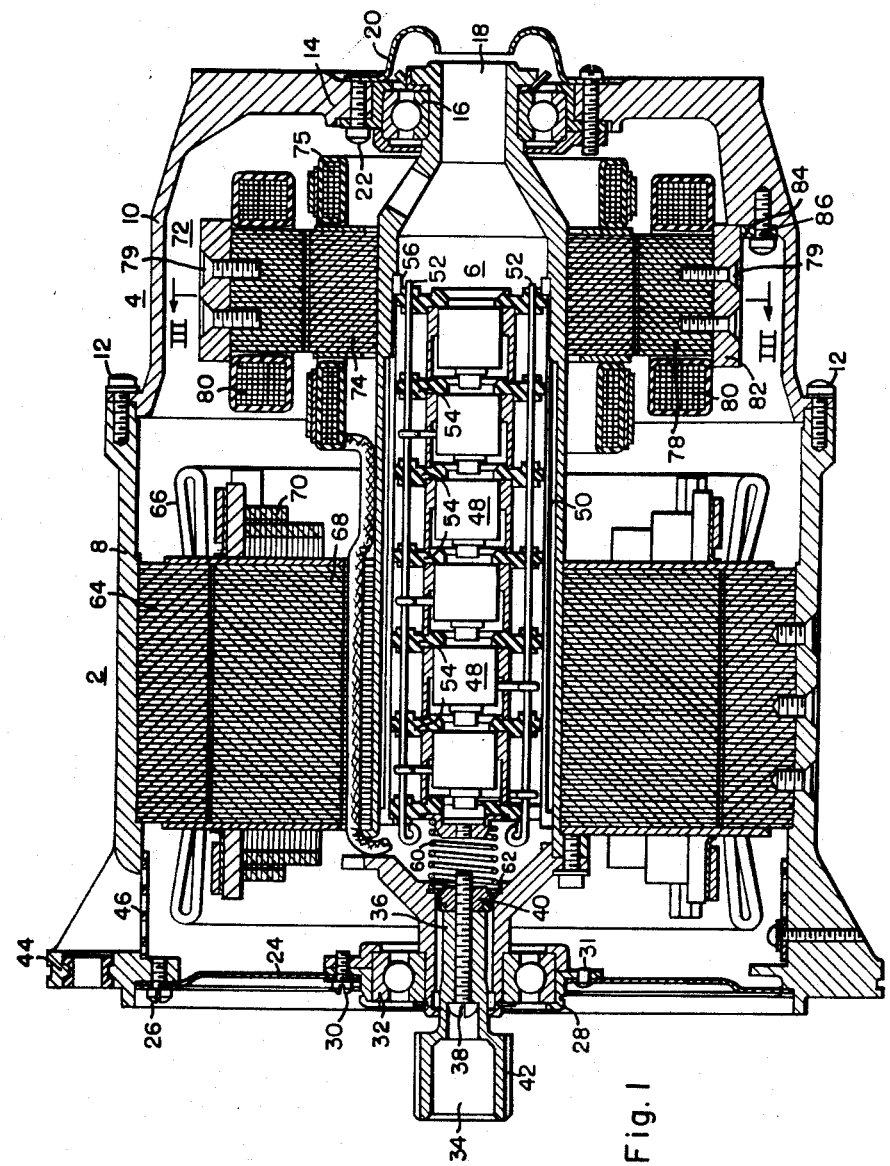
FIGURE 1 is a longitudinal sectional view of a generator and exciter employing the present invention.

The invention is generally applicable to dynamoelectric machines of any type or size and is particularly suitable for aircraft generators. The invention is shown in the drawings embodied in an alternating-current aircraft generator of the type known as the brushless type in which field excitation for the main generator 2 is supplied from an alternating-current exciter 4 through a rotating rectifier 6, thus eliminating brushes, commutators and slip rings.

The particular machine shown for the purposes of illustration includes a frame structure which may consist of two sections, a generator frame section 8 and an exciter frame section 10, secured together in any suitable manner as by bolts 12 passing through mating flanges. The exciter frame section 10 includes a bracket portion 14 at one end in which an antifriction bearing 16 is mounted. A hollow rotor shaft 18 is supported at one end in the bearing 16. Bearing 16 is covered by a bearing cover plate 20 secured to the bracket portion of frame section 10 in any suitable manner as for example, by bolts 22. The frame section 8 is closed at its end remote from frame section 10 by a cover plate 24 which is secured in any suitable manner as for example, by bolts 26. A bearing bracket 28 is secured to an end plate 24 in any suitable manner as by bolts 30 and rivets 31 in which an antifriction bearing 32 is mounted. The main generator end of shaft 18 is supported in bearing 32.

A drive spindle 34 having a splined shaft portion 36 is received in the end of hollow shaft 18 adjacent the cover plate 24. The drive spindle 34 may be secured against longitudinal displacement in any suitable manner as, for example, by a bolt 38 and a cooperating lock nut 40. The drive spindle 34 has an enlarged splined portion at 42 for engagement with a suitable driving means (not shown) and in use the machine is intended to be mounted on its prime mover by means of flange 44 with the splined end 42 of the shaft 18 supported in a driving member of the prime mover. The frame section 8 has circumferentially spaced openings about its periphery to permit ventilation. The interior of the main generator is protected from the entrance of foreign particles by an annular screen 46 which covers the aforesaid openings. It will, of course, be understood that if desired a conventional end bracket and bearing of any suitable type could be provided at the drive end of the machine.

Rectifier assembly 6 is disposed within the hollow shaft 18 and is shown as being mounted in a tubular housing 50 which is supported concentrically within the shaft 18 for rotation therewith. The rectifier assembly 6 consists of a suitable number of semiconductor rectifiers or diodes 48. The rectifier 48 may be of any suitable construction. Silicon diodes are preferably used because of their high current capacity and ability to operate at high temperatures. Any suitable number of rectifiers 48 may be provided and they are connected together in any suitable rectifier circuit by conductors 52. They are shown in FIG. 2 connected as a conventional three phase rectifier bridge circuit. Within the housing 50 the rectifiers are held in position in the housing and insulated from each other by generally annular spacer members 54 of insulating material which fit snugly in the housing 50 and are placed between the rectifiers to hold them in position. The rectifiers are held in position and in good contact within the housing at one end by a shoulder 56 on the inside diameter of the shaft 18, which shoulder abuts against the endmost insulator 54. At its other end, a compression spring 60 is held in position between the endmost insulator 54 and a shoulder 62 on the inside diameter of the hollow shaft 18, biasing the assembly toward shoulder 56.

As previously indicated, the machine illustrated by way of example is of the brushless type. The main generator stator core 64 is of the usual laminated construction and is supported in frame section 8 in any suitable manner, preferably in direct contact with the frame structure, so that heat can flow readily from the core to the frame. The core 64 carries alternating-current armature, windings 66 connected to a suitable terminal assembly (not shown). As best seen in FIGURE 2, three-phase armature windings are provided. The generator 2 has a laminated field structure 68 mounted on the shaft 18 carrying field winding 70. Excitation for the generator field windings 70 is provided by the alternating-current exciter 4 carried in the frame section 10 through rectifiers 6.

The exciter 4 is shown as a three-phase generator; however, it could be made as a single-phase, two-phase, or six-phase machine, etc., as circumstances require. The exciter 4 has a rotating armature, including the laminated core 74 of the usual construction, mounted on the shaft 18 carrying a three-phase alternating-current armature winding 75 as can be seen in FIGURE 2.

In accordance with the present invention, the field 72 of the exciter 4 includes permanent magnets 76 and electromagnets 78 having field windings 80. The permanent magnet poles 76 include a cylinder 76a and a bolt 87 having a head 87a which serves as a pole face. The field structure is an annular assembly comprising a ring 82, in which are secured main electromagnetic poles 78 and permanent magnet poles 76. The ring has a plurality of lugs 84 by which it is secured in the generator frame section 10 in any suitable manner as by bolts 86 passing through openings in the lugs 84 and threaded in the frame section 10. The main poles 78 are secured to the ring 82 by bolts 79. The permanent magnet poles are secured to the ring in the interpolar spaces between the main poles 78 by bolts 87. The permanent magnet poles 76 may be installed in such a manner as to provide alternately north and south poles at the air gap or they may all be of like polarity.

When the poles of the permanent magnet are arranged to alternate in polarity from pole to pole, the initial voltage will be of exciter fundamental frequency. The M.M.F. of the main pole and the M.M.F. of the interpolar magnet will add vectorially with the exciter armature M.M.F. to give a net resultant fundamental frequency flux under normal operating conditions.

With the permanent magnet poles arranged so as to have the same polarity at the air gap, the exciter will appear to have twice as many poles as its main field due to the consequent pole effect and will generate a system of voltage and current at twice normal frequency. These voltages and currents will be rectified by the rotating rectifier and the resultant fed to the main alternating rotating field. This D.C. field will cause the main generator 2 to develop voltage adequate to cause the regulator to proceed with normal build-up. Once the regulator is feeding direct current into the exciter field, the exciter will generate its normal frequency voltage and current. When the generator is up to rated voltage, the exciter armature reaction M.M.F. is in opposition to the permanent magnet M.M.F. and therefore almost completely cancels the effect of the permanent magnets.

In both arrangements the field strength of the permanent magnet poles is so much smaller than the field strength of the main exciter poles during normal running conditions that the effect of the permanent magnet poles is negligible. Which embodiment of the field structure is used depends primarily upon the combination of punchings available and certain other factors not relevant to the present invention.

As shown in FIG. 2, the exciter armature winding 75 is connected to the main generator field winding 70 through the rotating rectifier assembly 6 which is shown as a conventional three-phase rectifier bridge circuit. Since the exciter armature, the rectifier assembly and the generator field are all mounted on the same rotating shaft, they can be directly connected together and the generator is thus provided with direct-current excitation without requiring any commutator, brushes or slip rings. The main generator armatrue winding 66 is connected through a voltage regulator and rectifier 90 to the main field windings of the exciter, thus providing direct-current excitation for the exciter field winding 80. No external field flashing of the exciter is required since during initial starting conditions voltage build-up is provided by permanent magnet poles 76. The permanent magnet poles 76 are installed in a manner to cause the exciter armature reaction M.M.F. resulting from the initial flow of exciter armature current to polarize the main poles in the proper direction to aid the regulator in starting the build-up process. When the generator is up to rated voltage, the exciter armature reaction M.M.F. is in opposition to the permanent magnet M.M.F. and therefore almost completely cancels out the effects of the permanent magnet as hereinbefore pointed out. The permanent magnet field need be only of sufficient strength to cause enough voltage to be generated to initiate the rectifier action. The use of permanent magnet poles as described makes voltage build-up certain, yet has negligible effect during normal running conditions.

With the construction and electrical system hereinabove described, as the generator is operated or driven, the exciter 4 operates with it and the alternating current generated by the exciter is rectified by the rectifier 6 so that the rotating field of the generator 2 is supplied with direct current. As voltage is generated in the main generator 2, current is supplied through the rectifiers and voltage regulator 90 to the main field of the exciter, thereby building up to rated voltage. At rated voltage the effect of the permenant magnet pole 76 becomes insignificant.

It will now be apparent that a field structure for an exciter has been disclosed which has many advantages. The generator system becomes a self-contained entity, eliminating the requirement for field flashing. This has been accomplished with a very minimum of weight addition and in such a manner that the permanent magnet poles of the exciter have little or no effect under normal operating conditions. The new arrangement insures voltage build-up and voltage stability every time the system is run.

It is to be understood that although certain specific embodiments of the invention have been shown and described for the purpose of illustration, the invention is not limited to these specific embodiments. This field structure may be utilized in any type of generator and is not limited to use in aircraft or engine generators but is applicable to any type of synchronous alternating-current machine. It will be understood, therefore, that the invention is not limited to the specific embodiment and details of construction shown for the purpose of illustration, but in its broadest aspects it includes all equivalent embodiments and modifications.

I claim as my invention:

1. In combination, a dynamo-electric machine having a rotating shaft, a direct-current rotating field winding carried by said shaft, a stationary armature surrounding said field winding; an exciter including a rotating armature carried by said shaft, a stationary direct-current field structure surrounding said rotating armature, said field structure comprising a plurality of electromagnetic main poles and permanent magnet poles in the interpolar space between said main poles, said permanent magnet poles being of small field strength relative to said main poles during normal operation of said dynamoelectric machine, means connecting said rotating armature output and said rotating field for supplying exciting current for said rotating field whereby the effect of the permanent magnet poles is substantially cancelled during normal operation.

2. In combination, a dynamoelectric machine having a rotating shaft, a direct-current rotating field winding carried by said shaft, a stationary armature surrounding said field winding; an exciter including a rotating armature carried by said shaft, a stationary direct-current field structure surrounding said rotating armature, said field structure compising a plurality of electromagnetic main poles and permanent magnet poles in the interpolar space between said main poles, said permanent magnet poles all being of like polarity and of small field strength relative to said main poles during normal operation, means connecting said stationary armature output and said main pole windings for supplying exciting current for said main poles, means connecting said rotating armature output and said rotating field for supplying exciting current for said rotating field whereby the effect of the permanent magnet poles is substantially cancelled during normal operation.

3. In combination, a dynamoelectric machine having a rotating shaft, a direct-current rotating field winding carried by said shaft, a stationary armature surrounding said field winding; an exciter including a rotating armature carried by said shaft, a stationary direct-current field structure surrounding said rotating armature, said field structure comprising a plurality of electromagnetic main poles and permanent magnet poles in the interpolar space between said main poles, said permanent magnet poles being of small field strength relative to said main poles during normal operation of said dynamoelectric machine, consecutive permanent magnet poles being of unlike polarity, means connecting said stationary armature output and said main pole windings for supplying exciting current for said main poles, means connecting said rotating armature output and said rotating field for supplying exciting current for said rotating field whereby the effect of the permanent magnet poles is substantially cancelled during normal operation.

4. In combination, a dynamoelectric machine having a rotating shaft, a direct-current rotating field winding carried by said shaft, a stationary armature surrounding said field winding; an exciter including a rotating armature carried by said shaft, a stationary direct-current field structure surorunding said rotating armature, said field structure comprising a plurality of electromagnetic main poles and permanent magnet poles in the interpolar space between said main poles, said permanent magnet poles being of small field strength relative to said main poles during normal operation of said dynamoelectric machine, a rectifier carried by said shaft connected to said rotating armature output and said rotating field for converting alternating current from said rotating armature to direct current for exciting said rotating field, and a voltage regulator connected to said stationary armature output and said exciter main pole windings for converting alternating current from said stationary armature into direct current excitation for said exciter field whereby the effect of the permanent magnet poles is substantially cancelled during normal operation.

References Cited in the file of this patent

UNITED STATES PATENTS

| | | |
|---|---|---|
| 2,414,287 | Crever | Jan. 14, 1947 |
| 2,722,652 | Brainard | Nov. 1, 1955 |
| 2,811,658 | Brainard | Oct. 29, 1957 |